Sept. 27, 1932.   D. M. KUCHTA   1,879,756
BRICK CRATE
Filed Oct. 5, 1931   2 Sheets-Sheet 1
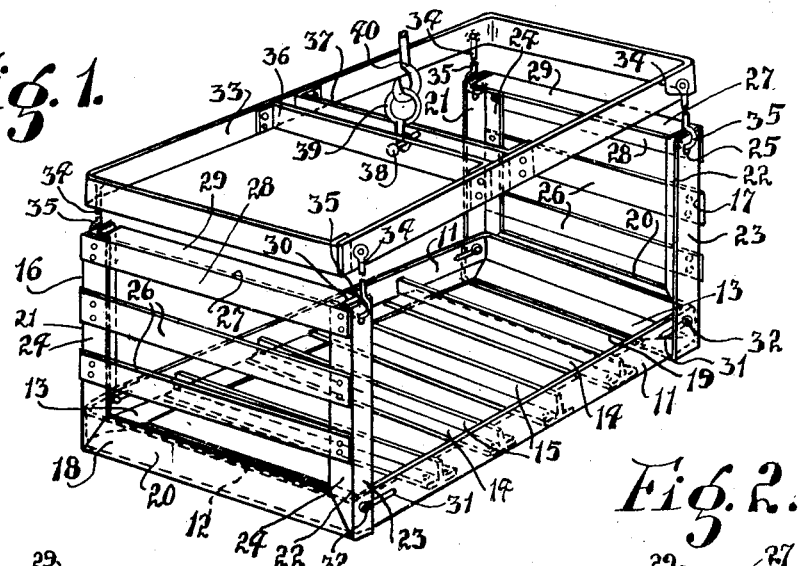
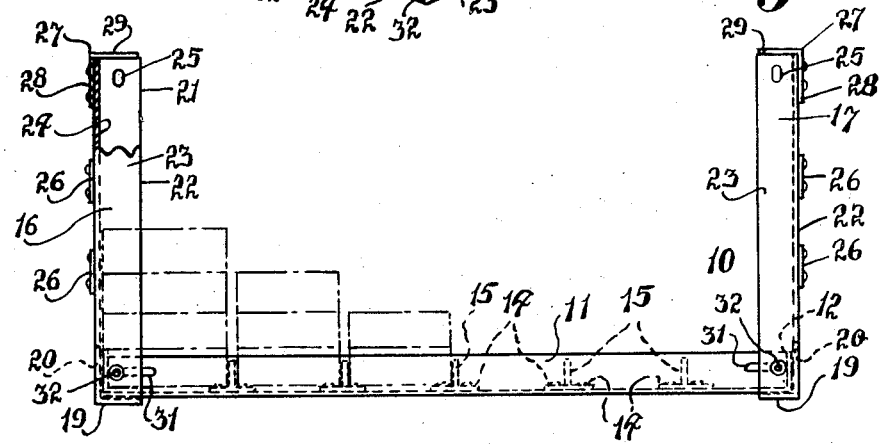
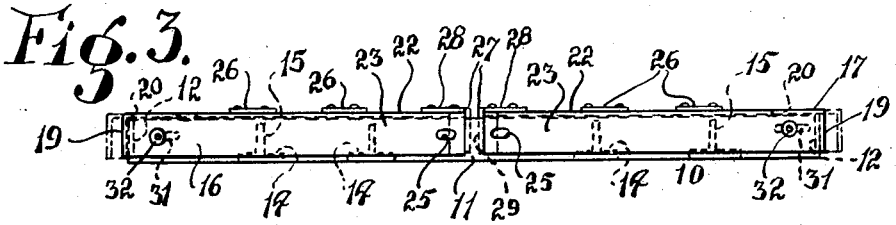
Daniel M. Kuchta
INVENTOR
BY
ATTORNEY

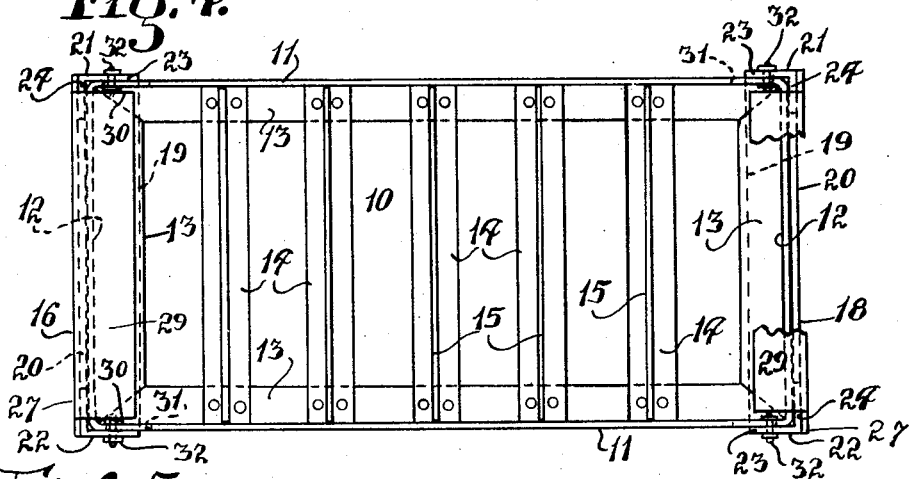
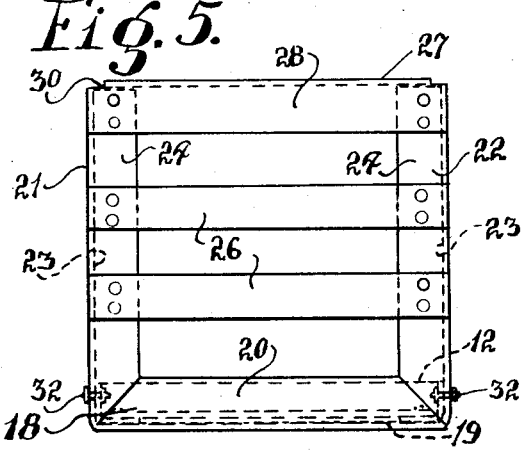
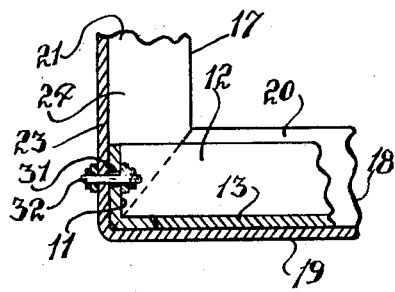
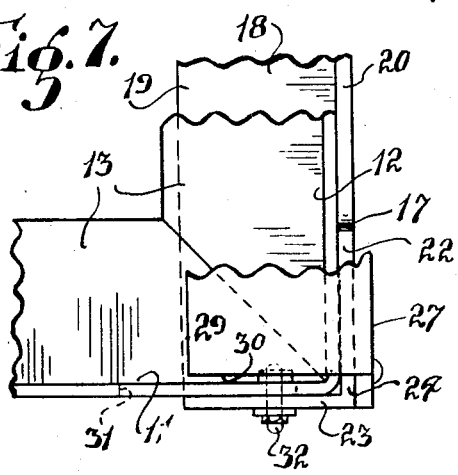

Patented Sept. 27, 1932

1,879,756

UNITED STATES PATENT OFFICE

DANIEL M. KUCHTA, OF BROOKLYN, NEW YORK

BRICK CRATE

Application filed October 5, 1931. Serial No. 566,932.

My invention relates to brick crates, and more particularly to a collapsible crate especially designed to permit the mechanical handling of hollow tiles or similar building material.

In the transportation of hollow tiles and similar building materials, it is desirable, not only to avoid manual handling thereof but to so pack them that they may be loaded and unloaded in bulk by mechanical appliances both at the yard, to and from boats or other vehicles and at the point of consumption. In securing this result I provide a crate or container in which the articles may be placed in the yards and in which they remain until delivered to the point of consumption. In transporting such articles, they are usually stowed in the holds and upon the decks of boats, and the use of such crates or containers is particularly desirable, not only because it avoids the manual handling of the separate articles during transportation from the yards to the boats, when loading same upon the boats, when unloading from the boats and loading upon trucks, and when unloading from the trucks themselves, but permits the loading and unloading of the crates or containers, whether full or empty, by means of derricks or cranes with little likelihood of breakage of the article or of the crate or container.

By making said crates or containers collapsible, the return transportation cost may be materially reduced, since the crates or containers themselves may be handled in bulk, and will occupy very much less cargo space than if they were not collapsed. Furthermore, the cost of trucking is also reduced because a truck can carry a very large number of collapsed crates in comparison with uncollapsed crates.

Crates embodying the invention are subject to very hard usage and are used in the handling of heavy material. It is not only essential that they possess strength sufficient to sustain the heavy loads which they are required to carry, but also to withstand hard usage during their return transportation while empty and collapsed. To minimize likelihood of the accidental spilling of the contents of a crate while being transported by cranes or derricks to and from boats and trucks, the crate is so constructed that it can be engaged by the means by which it is lifted and lowered in a manner to minimize likelihood of the possibility of tilting of the crate as a whole, a special top frame being provided to facilitate the handling of loaded crates, and the crates themselves being so constructed as to minimize possibility of the escape of crates piled one upon another in collapsed condition, from the cables or chains used in lifting and lowering such piles of crates. I also so construct such crates that when filled they may be readily stowed in the holds or upon the decks of boats, one upon the other, without likelihood of subjecting the hollow tiles or other articles to the load of other crates placed one upon another.

The crates of my invention are so constructed as to facilitate the stowing and unloading of the filled crates through hatchways, thus effecting a material saving in the time required in loading and unloading boats.

A crate embodying the invention not only permits the economical bulk handling of hollow tiles, or other similar building materials, but also permits great economy of transportation resulting in part from the expeditious loading and unloading of boats and trucks, and in part from a very material saving in the return transportation of the empty crates.

The various parts of the crate or container are so constructed and combined as to ensure all of the parts remaining in the proper relation whether the crate is loaded or collapsed, thus avoiding those inconveniences and delays resulting from lost parts or an improper assembly of parts when loading tiles or other articles thereon. The various parts are so constructed and combined that possibility of the accidental collapsing of the crate or container, when loaded, is impossible, and the power for lifting and lowering the loaded crates or containers is applied in a manner to develop no shearing strains upon the pivots permitting the collapsing of the structure.

The invention consists primarily in a brick crate embodying therein a metal tray having upwardly projecting side and end flanges, end frames each having a bottom rail adapted to pass beneath and engage said tray, uprights at opposite ends of said bottom rail, having means whereby tackle may be connected therewith adjacent the top thereof, and means partially closing the space between said uprights, and means pivotally connecting the side rails of said crate and each of said end frames, whereby the bottom rail of said end frames may be engaged with the bottom of said tray so as to transmit the lifting stresses directly to said tray, or be disengaged therefrom to permit the folding of the end frame upon said tray; and in such other novel features of construction and combination of parts as are hereinafter set forth and described, and more particularly pointed out in the claims hereto appended.

Referring to the drawings,

Fig. 1 is a perspective view of a crate in its extended position preparatory to hand loading thereof;

Fig. 2 is a side view thereof, having indicated thereon, in dotted lines, tiles;

Fig. 3 is a side view of the collapsed structure;

Fig. 4 is a plan view of the extended crate;

Fig. 5 is an end view thereof;

Fig. 6 is a detail view in section upon an enlarged scale, at one of the corners of the crate; and Fig. 7 is a plan view at one of the corners of the crate upon a larger scale.

Like numerals refer to like parts throughout the several views.

In the embodiment of the invention shown in the drawings, the tray 10 consists of a rectangular angle metal frame having side bars and end bars the former of which have upwardly directed side flanges 11 and the latter of which have upwardly directed flanges 12, all of said bars having inwardly directed bottom flanges 13.

While the dimensions of this tray may be varied, those shown in the drawings, are approximately six feet long and three feet wide.

Extending from side bar to side bar and secured by spot welding, riveting or in any other desired manner to the inwardly directed bottom flanges 13 thereof are cross cleats 14, preferably formed of T-bars, the heads of which are secured to said bottom flanges, and the stems 15 of which project upwardly within the tray. These cross cleats serve to stiffen the bottom of the tray and to reinforce the side bars of the frame of the tray intermediate the end bars of the frame. Where, as shown in the drawings, the crate is designed to handle twelve-inch tiles, the cleats 14 are spaced at approximately twelve-inch centers, so that the stems 15 of adjacent cleats, and the flange 12 of the end bar of the frame will receive between them a transverse row of tiles, thus affording adequate support for the tiles in each row and avoiding possibility of shiftings of the tiles when once loaded upon the crate.

Pivotally and slidably connected with the tray 10 adjacent the opposite ends thereof are end frames 16 and 17. Each of these frames is identical with the other, so that a detailed description of but one of them is necessary. Each end frame consists of an angle metal bottom rail 18, one flange 19 of which is adapted to pass beneath and engage the bottom flange 13 of the adjacent end bar of the tray, and the other flange 20 of which is adapted to project upwardly when the crate is extended so as to engage the flange 12 of the end bar of the tray.

Said end frame also includes therein angle metal uprights 21 and 22, which are preferably formed integrally with the bottom rail 18. One flange 23 of each upright extends parallel with the flange 11 of the adjacent side bar of the tray, and the other flange 24 of each upright extends parallel with the flange 12 of the end bar of the tray.

Adjacent the top of the flange 23 of each upright, I provide an opening, shown at 25, by means of which the tackle for raising and lowering the crate may be conveniently attached and conveniently disconnected from the crate. The other flanges 24 of the uprights 21 and 22 are connected by cross braces 26 having the three-fold function of preventing escape of the tiles at the ends of the crate, staying both uprights to avoid racking of the end frame structure through which the load of the crate is transmitted to the hoisting machinery, and closing the top of the crate in a manner to permit the stacking of crates when collapsed. A plurality of such braces 26 are employed, and their spacing is such as to secure the desired engagement with the tiers of tiles upon the tray in a manner to minimize likelihood of the escape of tiles above the ends of the tray.

Connecting the tops of the angle metal uprights 21 and 22 of each end frame is an angle metal top brace 27 having a downwardly directed flange 28 which is spot welded, riveted or otherwise secured to the flanges 24 of the angle metal uprights, and a flange 29 projecting inwardly of the crate and slotted as shown at 30 adjacent its opposite ends, and the flanges 23 of the uprights, so that when the crate is collapsed, this flange 29 is permitted to pass the side flanges of the tray. In this manner the end frame may be positioned substantially horizontally upon the tray so that empty trays may be piled one upon another for their return shipment to the yards. This possibility of compactly loading a large number of trays upon trucks and in the holds and upon the decks of boats effects a very material saving in the cost of transporting the tiles, as well as great reduction in the cost of handling the crates in their collapsed condition. This will appear more fully hereinafter.

The flange 29 of the top bar 27 is used to facilitate the stacking of loaded crates, one upon the other, in a manner to save stowage space. It also avoids possibility of the weight of one crate coming upon the tiles in a lower crate as a result of the tilting of the upper crate, with a resultant breakage of such tiles and the spilling of tiles in the upper crate.

To permit the extension and collapsing of the crates, to ensure an inseparable relation of the various parts of the crate and to assure a position of these parts in a loaded crate which will relieve the mechanisms connecting the tray and the end frames and permitting their relative movement, from shearing stresses, I provide pivotal connections between the tray and the end frames which as the crate is extended will cause the flanges 19 of the bottom rail of said frames to pass beneath, and engage the tray so that when a crane or derrick is used to lift the crate, the load of the tray will be taken up by the end frames and not by such pivotal connections. This means, in the form of the invention shown, consists of an elongated slot 31 formed in the side flanges 11 and a pivot 32, carried by the flange 23 and slidable and rotatable in the slot 31. This slot and pivot connection permits movement of the end frames longitudinally of the tray in a manner to bring the collapsed end frames within the dimensions of the tray. The height of the collapsed crate as shown in the drawings is approximately one-sixth of that of the extended crate, although this is not a fixed dimension.

In order to ensure the distribution of the lifting stresses of a crane or derrick throughout the crate, in a manner to minimize likelihood of any tilting thereof, I preferably provide a rectangular frame 33, the form and dimensions of which are substantially the same as those of the tray 10. Depending from each corner of this frame is a cable or chain 34 carrying a hook 35 adapted to be connected with an upright of an end frame by being passed through the opening 25. Substantially at the longitudinal center of the frame 33 are parallel cross stays 36 and 37 extending between and secured to which is a pin 38 having connected therewith an eye-link 39 with which the tackle hook of the derrick or crane may be connected. Such a hook is shown at 40 in Fig. 1 of the drawings.

Various savings may be effected by the use of the crate of the invention, due in part to the fact that the manual handling of the tiles is limited to their piling in the crate at the point of production, and their removal from the crate at the point of consumption. Between the production and the consumption points the tiles must be moved four or five times, according to the location of the yards and of the construction work on which the tiles are to be used. This movement, however, is of the loaded crates and not of the individual tiles. This manner of handling the tiles in bulk, by means of the crate of the invention, avoids all wastage and breakage ordinarily occurring as a result of manual handling of tiles. Furthermore, the ease with which the crates can be handled by means of machinery effects a very material saving in the time required to load and unload boats. This results in a great reduction in the transportation costs since the charges upon such boats are based upon the time and labor required to load and unload, and the towage charges. These boats, like railway cars, are subject to a demurrage charge while waiting to be loaded and unloaded, and during such process.

In addition to the savings above referred to, there is a saving resulting from the ability to stow a large number of collapsed crates in the hold and deck space of a boat, such crates occupying about one-sixth of the space required for the extended crates.

Furthermore, with the construction of crate herein shown and described, a crane or derrick can handle, in a day, a materially greater number of loaded crates than with other devices used for handling tiles and similar articles in bulk. The rapid handling of the crates will effect further savings because of the increased daily capacity of the trucks used for transporting the crates to and from the boats.

To secure the above advantages, the construction of the crate must be not only such as to withstand the severe usage to which it is subjected, but all of the parts thereof must be embodied in a unitary structure so that a complete, fully operative crate is available at all times, and the manner of connecting the parts must be such as to permit the free collapsing or extension of the crate and avoid injury to the mechanisms by which this is accomplished as a result of such.

The crate must also be constructed in a manner to permit the close stowing of same in the holds upon the decks of boats, whether loaded or collapsed, while at the same time permitting a quick convenient attachment of the crane or derrick tackle thereto.

The above will be readily understood from a description of the manner in which the tiles are handled when using crates embodying the invention.

The collapsed crates may be conveniently stored adjacent the ovens or kilns, and, when making a shipment of tiles, the crate is brought adjacent the kilns and the tiles are loaded in rows and tiers upon a crate. Before filling the crate it is essential that the end frames be moved longitudinally of the crate, the slot and pivot connection permitting this movement, and the raising of the end frames, which can be done when the bottom rail 19 is moved sufficiently away from the flange 12 of the end bar to permit turning movement of the end frames. Such end frames are merely turned about the pivots 32, this turning movement bringing the flange 19 of the bottom rail 18 beneath and in abutting relation to the bottom flanges 13 of the end and side bars of the tray adjacent one end thereof. It will also bring the flange 20 of the bottom rail in substantially abutting relation to the flange 12 of the end bar.

The pivot 32 has a loose fit in the slot 31 so that any upward stresses upon the end frames will engage the bottom rail thereof with the bottom of the crate, or stated inversely, the load of the tray will cause it to engage said bottom rail.

The T-cross cleats 14 do not only impart great rigidity to the tray structure, but will prevent shifting of the bottom rows of tiles in relation to each other, and at the same time minimize likelihood of the shifting of the upper tiers of tiles.

The side flanges 11 and 12 of the tray will confine the lower rows of tiles in a manner to minimize possibility of any slippage of all of the tiles contained in the crate. The angular uprights 21 and 22 of the end frames will also confine the corner tiles of the various tiers, and the cross braces 26 and top bar 27 of the end frames will also serve to prevent shifting of the tiles in the upper tiers.

When a crate is completely filled, it is lifted by means of a crane or derrick, furnished with a top frame 33, it being merely necessary for a laborer to engage the hooks 35 with the openings 25 in the respective corner uprights 21 and 22. This can be rapidly done.

As the crates are filled they are transported to the dock and allowed to accumulate until a boat load is available, whereupon they may be lifted one at a time by a derrick, furnished with a similar top frame 33, and lowered within the hold of the boat and upon the deck, one crate being piled upon another. To facilitate this stowing of the crates, I provide the flange 29 of the top bar 27 which affords an ample supporting area on crates in lower tiers, for crates in higher tiers. With this construction, the entire weight of the filled tray, during the lifting of the crate, will be borne by the bottom bars 18 and the uprights 21—22 of the end frame which are so formed and stayed as to prevent any possible collapsing thereof.

When unloading a boat, the tops of the uprights are always conveniently accessible to the laborers, so that the derrick or crane may be hooked on to the crate with great rapidity.

As the crates are removed by the crane or derrick from the boat, they are deposited directly upon trucks and transported thereby to the point of consumption. When they reach the building operation, the crates are transported by other derricks to the height at which they are to be used and unloaded by hand. After unloading, the crates are collapsed and stored until a sufficient number has been accumulated. Collapsing requires merely the turning of the end frames downwardly about the axes of the pivots 32 until the braces 26 and flanges 19 and 28 rest upon the top of the side and end flanges 11 and 12. The slots 30 in the flange 29 permit said flange to pass within the tray. When the end frames have been so folded, they are slid along the top of the tray until the flanges 19 abut against the end flanges 12. When the crate is collapsed, its overall dimensions are substantially the same as when it is extended, except as to the height.

It will be noted, by reference to Fig. 3, in which the crate is shown collapsed, that the edge of the flange 19 is positioned above the bottom flanges 13 so as to leave an angular pocket. A number of collapsed crates are then piled, one upon the other, and a looped chain or cable is passed beneath the angular pocket above referred to, laterally of the tray and upwardly, converging to the hook of the crane or derrick tackle. With this condition there is no tendency of the chains or cables to escape from the pile of collapsed crates, and the run of the loops will be adjacent the side flanges 11 of such crates so as to ensure a proper control thereof.

The use of angle bars as described is particularly desirable because it permits the formation of the frame of the crate and the end frames by a mitreing and bending operation while establishing the desired relation of parts to ensure the retention of the tiles when the crate is filled, and the establishment of the proper relation of the tray and the end frame when the crate is collapsed.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A brick crate embodying therein a metal tray having upwardly projecting side and end flanges, end frames each having a bottom rail adapted to pass beneath and engage said tray, uprights at opposite ends of said bottom rail, having means whereby tackle may be connected therewith adjacent the top thereof, and braces extending from upright to upright, and pivotal and slidable connections between each upright and the adjacent side flange of said tray, whereby said end frames have pivotal movement to permit the engagement of said bottom rail with the bottom of said tray so as to transmit the lifting stresses directly to said tray, or combined pivotal and sliding movement to disengage said bottom rail from, and the folding of said end frame upon, said tray.

2. A brick crate embodying therein a metal tray having upwardly projecting side and end flanges, end frames each having an angle metal bottom rail adapted to pass beneath and engage said tray, angle metal uprights at opposite ends of said bottom rail, having means whereby tackle may be connected therewith adjacent the top thereof, one of the flanges of each of said uprights being parallel with the adjacent side flange of the tray, and braces extending from upright to upright, and pivotal and slidable connections between the adjacent parallel flanges of said uprights and whereby said end frames have pivotal movement to permit the engagement of said bottom rail with the bottom of said tray so as to transmit the lifting stresses directly to said tray, or combined pivotal and sliding movement to disengage said bottom rail from, and the folding of said end frame upon, said tray.

3. A brick crate embodying therein a metal tray having upwardly projecting side and end flanges, end frames each having an angle metal bottom rail adapted to pass beneath and engage said tray, angle metal uprights at opposite ends of said bottom rail, having means whereby tackle may be connected therewith adjacent the top thereof, one of the flanges of each of said uprights being parallel with the adjacent side flange of the tray, a top angle brace having one flange slotted adjacent each upright, and braces extending from upright to upright, and pivotal and slidable connections between the adjacent parallel flanges of said uprights and whereby said end frames have pivotal movement to permit the engagement of said bottom rail with the bottom of said tray so as to transmit the lifting stresses directly to said tray, or combined pivotal and sliding movement to disengage said bottom rail from, and the folding of said end frame upon, said tray.

4. A brick crate embodying therein a metal tray having a frame consisting of angle metal side and end bars, one flange of each of said bars projecting upwardly, and the other flange inwardly, of said frame, cross cleats connecting the inwardly directed flanges of said side bars, end frames each having an angle metal bottom rail adapted to pass beneath and engage said tray, angle metal uprights at opposite ends of said bottom rail, having means whereby tackle may be connected therewith adjacent the top thereof, one of the flanges of each of said uprights being parallel with the adjacent side flange of the tray, and braces extending from upright to upright, and pivotal and slidable connections between the adjacent parallel flanges of said uprights and consisting of an elongated slot adjacent the end of the upright flange of each side bar, and a pivot carried by the adjacent parallel flange of an upright passing through said slot, whereby said end frames have pivotal movement to permit the engagement of said bottom rail with the bottom of said tray so as to transmit the lifting stresses directly to said tray, or combined pivotal and sliding movement to disengage said bottom rail from, and the folding of said end frame upon, said tray.

5. A brick crate embodying therein a metal tray having a frame consisting of angle metal side and end bars, one flange of each of said bars being directed upwardly, and the other flange being directed inwardly, of said frame, spaced T-cleats extending between and secured to the inwardly directed flanges of said side bars, the stems of said T-cleats projecting upwardly of said tray, end frames each having a bottom rail adapted to pass beneath and engage said tray, uprights at opposite ends of said bottom rail, having means whereby tackle may be connected therewith adjacent the top thereof, and braces extending from upright to upright, and pivotal and slidable connections between each upright and the adjacent side flange of said tray, whereby said end frames have pivotal movement to permit the engagement of said bottom rail with the bottom of said tray so as to transmit the lifting stresses directly to said tray, or combined pivotal and sliding movement to disengage said bottom rail from, and the folding of said end frame upon, said tray.

6. A brick crate embodying therein a metal tray having a frame consisting of angle metal side and end bars, one flange of each of said bars being directed upwardly, and the other flange being directed inwardly, or said frame, spaced T-cleats extending between and secured to the inwardly directed flanges of said side bars, the stems of said T-cleats projecting upwardly of said tray, end frames each having an angle metal bottom rail adapted to pass beneath and engage said tray, angle metal uprights at opposite ends of said bottom rail, having means whereby tackle may be connected therewith adjacent the top thereof, one of the flanges of each of said uprights being parallel with the adjacent side flange of the tray, a top angle brace having one flange slotted adjacent each upright, and braces extending from upright to upright, and pivotal and slidable connections between the adjacent parallel flanges of said uprights and whereby said end frames have pivotal movement to permit the engagement of said bottom rail with the bottom of said tray so as to transmit the lifting stresses directly to said tray, or combined pivotal and sliding movement to disengage said bottom rail from, and the folding of said end frame upon, said tray.

7. A brick crate embodying therein a metal tray having a frame consisting of angle metal side and end bars, one flange of each of said bars being directed upwardly, and the other flange being directed inwardly, of said frame, spaced T-cleats extending between and secured to the inwardly directed flanges of said side bars, the stems of said T-cleats projecting upwardly of said tray, end frames each having an angle metal bottom rail adapted to pass beneath and engage said tray, angle metal uprights at opposite ends of said bottom rail, having means whereby tackle may be connected therewith adjacent the top thereof, one of the flanges of each of said uprights being parallel with the adjacent side flange of the tray, and braces extending from upright to upright, and pivotal and slidable connections between the adjacent parallel flanges of said uprights and consisting of an elongated slot adjacent the end of the upright flange of each side bar, and a pivot carried by the adjacent parallel flange of an upright passing through said slot, whereby said end frames have pivotal movement to permit the engagement of said bottom rail with the bottom of said tray so as to transmit the lifting stresses directly to said tray, or combined pivotal and sliding movement to disengage said bottom rail from, and the folding of said end frame upon, said tray.

8. A brick crate embodying therein a metal tray having upwardly projecting side and end flanges, end frames each having a bottom rail adapted to pass beneath and engage said tray, uprights at opposite ends of said bottom rail having means whereby tackle may be connected therewith adjacent the top thereof, and means partially closing the space between said uprights, and means pivotally connecting the side rails of said crate and each of said end frames, whereby the bottom of said end frames may be engaged with the bottom of said tray so as to transmit the lifting stresses directly to said tray, or be disengaged therefrom to permit the folding of the end frame upon said tray.

In witness whereof I have hereunto affixed my signature, this 29th day of September, 1931.

DANIEL M. KUCHTA.